United States Patent [19]

Anticole

[11] Patent Number: 5,304,913
[45] Date of Patent: Apr. 19, 1994

[54] MULTIPHASE PULSE WIDTH MODULATOR FOR A MULTIPHASE MOTOR

[75] Inventor: Robert B. Anticole, Bradford Woods, Pa.

[73] Assignee: Contraves Goerz Corporation, Pittsburgh, Pa.

[21] Appl. No.: 593,120

[22] Filed: Oct. 5, 1990

[51] Int. Cl.$^5$ .............................................. H02P 5/40
[52] U.S. Cl. ................................... 318/811; 388/811; 318/798
[58] Field of Search .............. 318/599, 600, 811, 807, 318/729, 696, 439, 596; 388/811, 819

[56] References Cited

U.S. PATENT DOCUMENTS

| | | | |
|---|---|---|---|
| 3,781,615 | 12/1973 | Mokrytzki et al. | 318/808 |
| 3,809,990 | 5/1974 | Kuo et al. | 318/696 |
| 3,854,077 | 12/1974 | Greenwell | 318/808 |
| 3,953,774 | 4/1976 | Sato et al. | 318/596 |
| 4,366,533 | 12/1982 | Kohata et al. | 318/801 |
| 4,409,535 | 10/1983 | Hickman | 318/811 |
| 4,581,693 | 4/1986 | Ueda et al. | 318/811 |
| 4,879,502 | 11/1989 | Endo et al. | 318/808 |
| 4,884,183 | 11/1989 | Sable | 318/811 |
| 4,904,920 | 2/1990 | Rufer | 318/805 |
| 4,914,375 | 4/1990 | Hatanaka | 318/729 |
| 5,017,855 | 5/1991 | Byers et al. | 318/811 |
| 5,023,528 | 6/1991 | Saidin et al. | 318/439 |
| 5,137,119 | 8/1992 | Horbruegger et al. | 318/600 |

Primary Examiner—William M. Shoop, Jr.
Assistant Examiner—John W. Cabeca
Attorney, Agent, or Firm—Ansel M. Schwartz

[57] ABSTRACT

The present invention pertains to a multiphase pulse width modulator which allows for continuous conduction of current through each winding of a multiphase motor at all times of the motor's operation. In a preferred embodiment, the multiphase pulse width modulator is for an N-phase motor, where $N \geq 3$. The multiphase pulse width modulator is comprised of a clock for producing a switching frequency. The modulator is also comprised of means for providing N phase displaced signals to the respective N phases of the N phase motor such that the signals allow for continuous conduction of current through each winding in the motor at all times of the motor's operation. The providing means is connected to the clock for receiving the switching frequency, and connected to the N phases of the N phase motor to provide the N signals to the respective N phases of the N phase motor.

11 Claims, 6 Drawing Sheets

MULTIPHASE PULSE WIDTH MODULATOR FOR A MULTIPHASE MOTOR

FIELD OF THE INVENTION

The present invention is related to pulse width modulators. More specifically, the present invention is related to a pulse width modulator which provides for continuous conduction in a multiphase motor at all times of the motor's operation.

BACKGROUND OF THE INVENTION

The prior art, as shown in FIG. 7, discloses a single phase triangle wave fed to each pulse width modulator of a three phase drive. The result is that all upper transistors can turn on during ½ of the pulse width modulator cycle, and all lower devices can turn on during the other ½ cycle. This results in no current flow and no conduction and no gain when the command is zero. A large three phase command causes a condition where current is always flowing in a winding (continuous conduction) and results in full gain. In between is discontinuous conduction where the gain varies from zero to maximum. FIG. 8 shows a graph of the gain of the motor through zero command with respect to the prior art.

Discontinuous conduction causes a stability problem in high bandwidth servos by reducing gain and bandwidth. See *IEEE Transactions on Industry Applications*, Vol. 1A-21, No. 1, January/February 1985. The present invention allows for continuous conduction at all times (even zero command), by providing a phase difference between oscillator signals provided to each pulse width modulator. The result is that gain is held constant through zero command because no discontinuous conduction occurs.

SUMMARY OF THE INVENTION

The present invention pertains to a multiphase pulse width modulator (MPWM) which allows for continuous conduction of current through each winding of a multiphase motor at all times of the motor's operation. In a preferred embodiment, the multiphase pulse width modulator is for an N-phase motor, where $N \geq 3$. The multiphase pulse width modulator is comprised of a clock for producing a switching reference frequency signal. The MPWM is also comprised of means for providing N signals to the respective N phases of the N phase motor such that the signals allow for continuous conduction of current through each winding in the motor at all times of the motor's operation. The providing means is connected to the clock for receiving the switching frequency, and connected to the N phases of the N phase motor to provide the N signals to the respective N phases of the N phase motor.

BRIEF DESCRIPTION OF THE DRAWINGS

In the accompanying drawings, the preferred embodiments of the invention and preferred methods of practicing the invention are illustrated in which:

FIG. 4 also shows the +, − and zero input commands and the corresponding outputs.

DESCRIPTION OF THE PREFERRED EMBODIMENT

Figure 1:
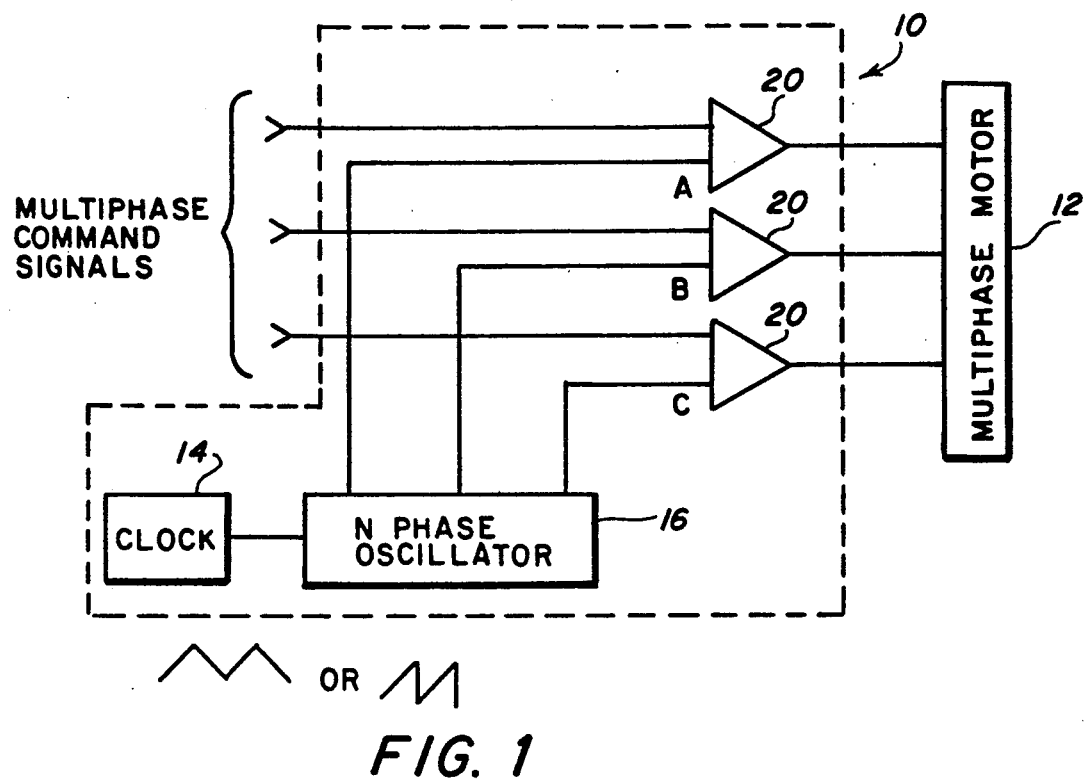
FIG. 1 is a schematic representation of a multiphase pulse width modulator.

Referring now to the drawings wherein like reference numerals refer to similar or identical parts throughout the several views, and more specifically to FIG. 1 thereof, there is shown a schematic representation of a multiphase pulse width modulator (MPWM) 10. The multiphase pulse width modulator 10 allows for continuous conduction of current through each winding of a multiphase motor 12 at all times of the motor's 12 operation. The pulse width modulator 10 preferably is for an N-phase motor 12, where $N \geq 3$.

Figure 9:
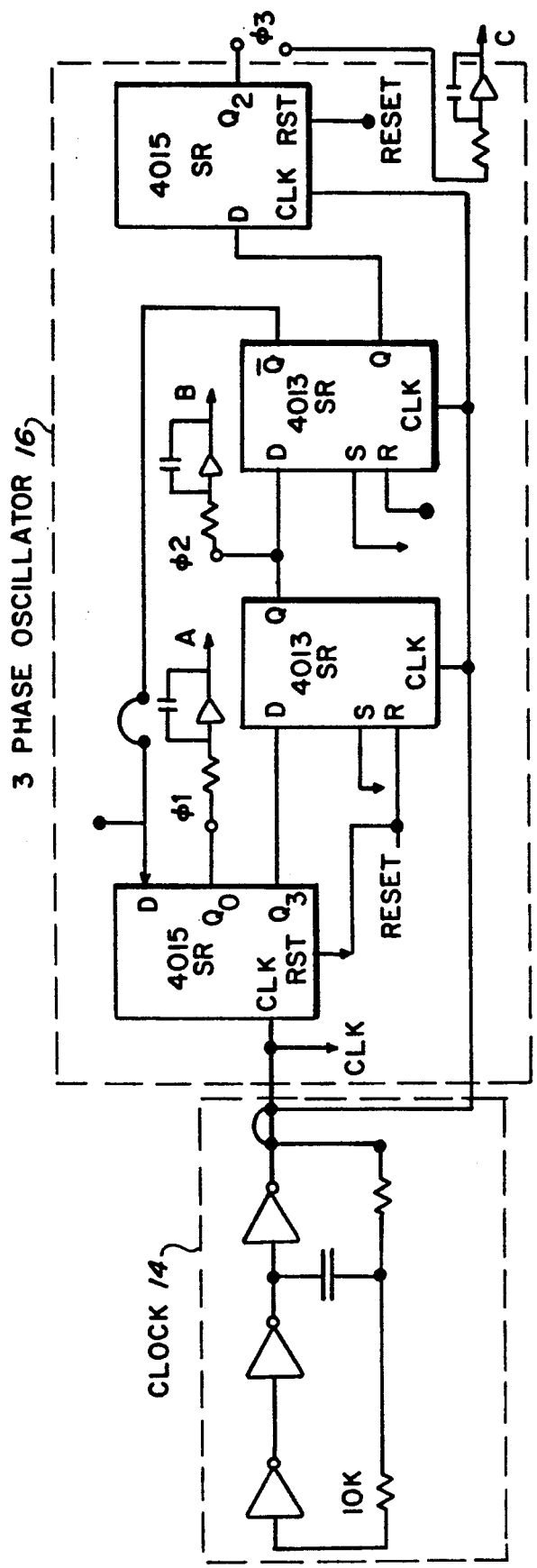
FIG. 9 is a schematic representation of a clock circuit and a three phase oscillator circuit.

In the preferred embodiment, the MPWM 10 is comprised of a clock 14 for producing a reference switching frequency signal. An example of a circuit for a clock 14 is shown in FIG. 9. The MPWM 10 is also comprised of means for providing N signals to the respective N phases of the N phase motor 12 such that the signals allow for continuous conduction of current through each winding in the motor 12 at all times of the motor's operation. The providing means is connected to the clock 14 for receiving the switching frequency, and connected to the N phases of the N phase motor 12 to provide the N signals to the respective N phases of the N phase motor. Preferably, the providing means includes an N phase oscillator 16 for producing N oscillator signals, each of which are out of phase by a predetermined amount. The oscillator is electrically connected to the clock 14 to receive the switching signal. The providing means preferably also includes N comparators 20 electrically connected to the N phase oscillator 16 and to the respective N phases of the N phase motor 12 for providing a respective comparator signal corresponding to the respective signal received from the oscillator 16 such that the N comparator signals allow for continuous conduction in the motor 12 during the operation of the motor 12.

Figure 10:
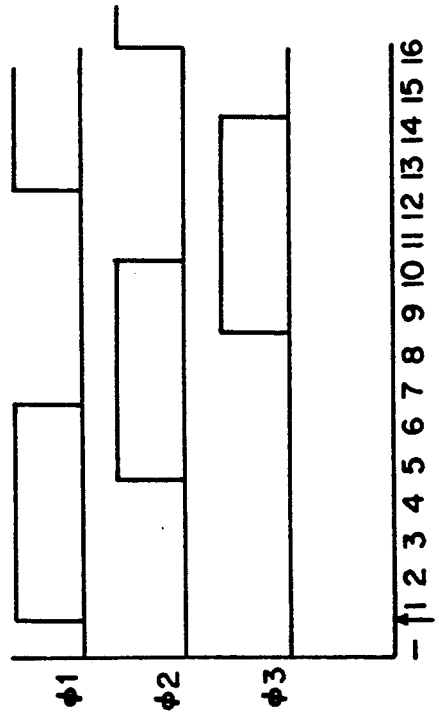
FIG. 10 is a graph of a signal which when provided to an integrator produces a saw tooth signal.

The oscillator 16 provides, for example, N triangular or saw tooth signals to the comparators 20. Each triangular or saw tooth signal is phase displaced by a predetermined amount from the other signals. See FIG. 10 which shows a signal when provided to an integrator produces a triangular signal.

Figure 2:
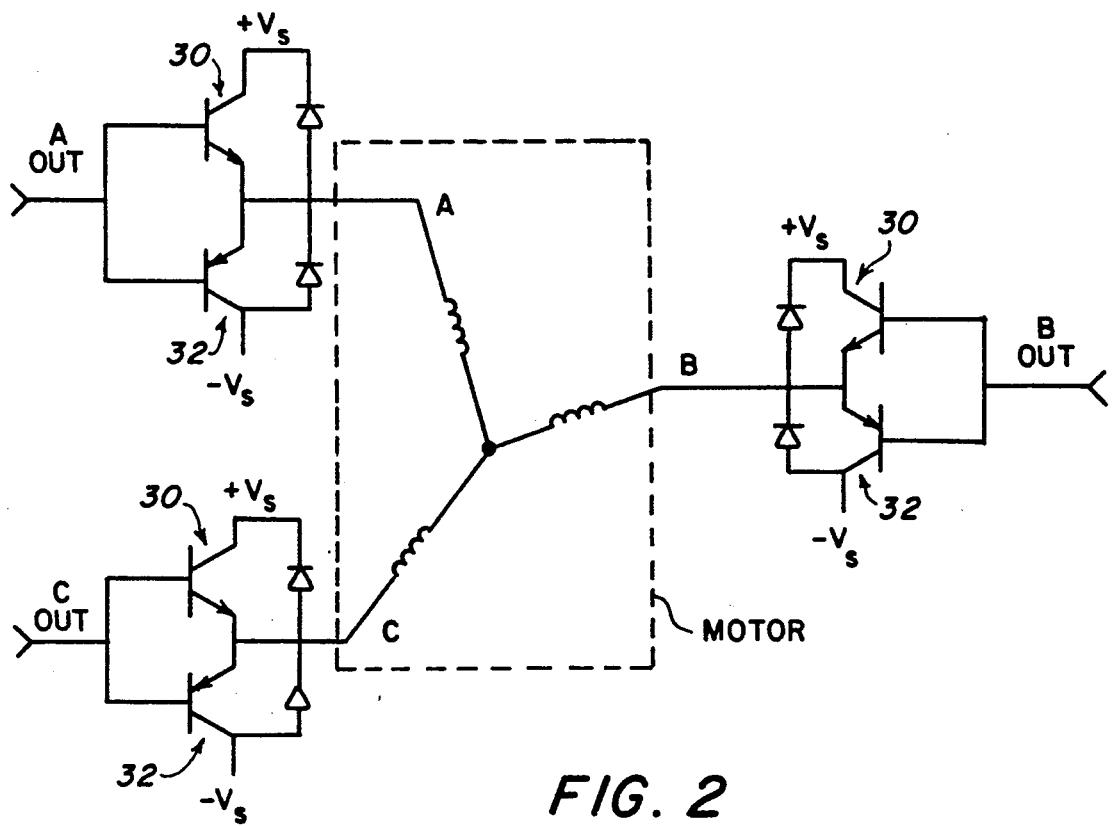
FIG. 2 is a schematic representation of a three phase motor and driver.

The N phase motor 12 is preferably a three phase motor as shown in FIG. 2, which is a schematic representation of a three phase motor and driver. Additionally, each signal produced from the N phase oscillator is 360°/N out of phase with each other but can be more or less. Preferably, each comparator 20 also receives a predetermined command signal.

In the operation of the preferred embodiment and referring to FIG. 1, oscillator signals are phase displaced and are provided to the comparators 20 from the three phase oscillator 16. The oscillator signals in FIG. 3, identified as A, B and C, are received at the A input port, the B input port and the C input port of the respective comparators 20. The three phase oscillator 16 receives the clock signal and provide respective signals to be received by the respective comparators 20, which are out of phase with the other oscillator signals.

Figure 3:
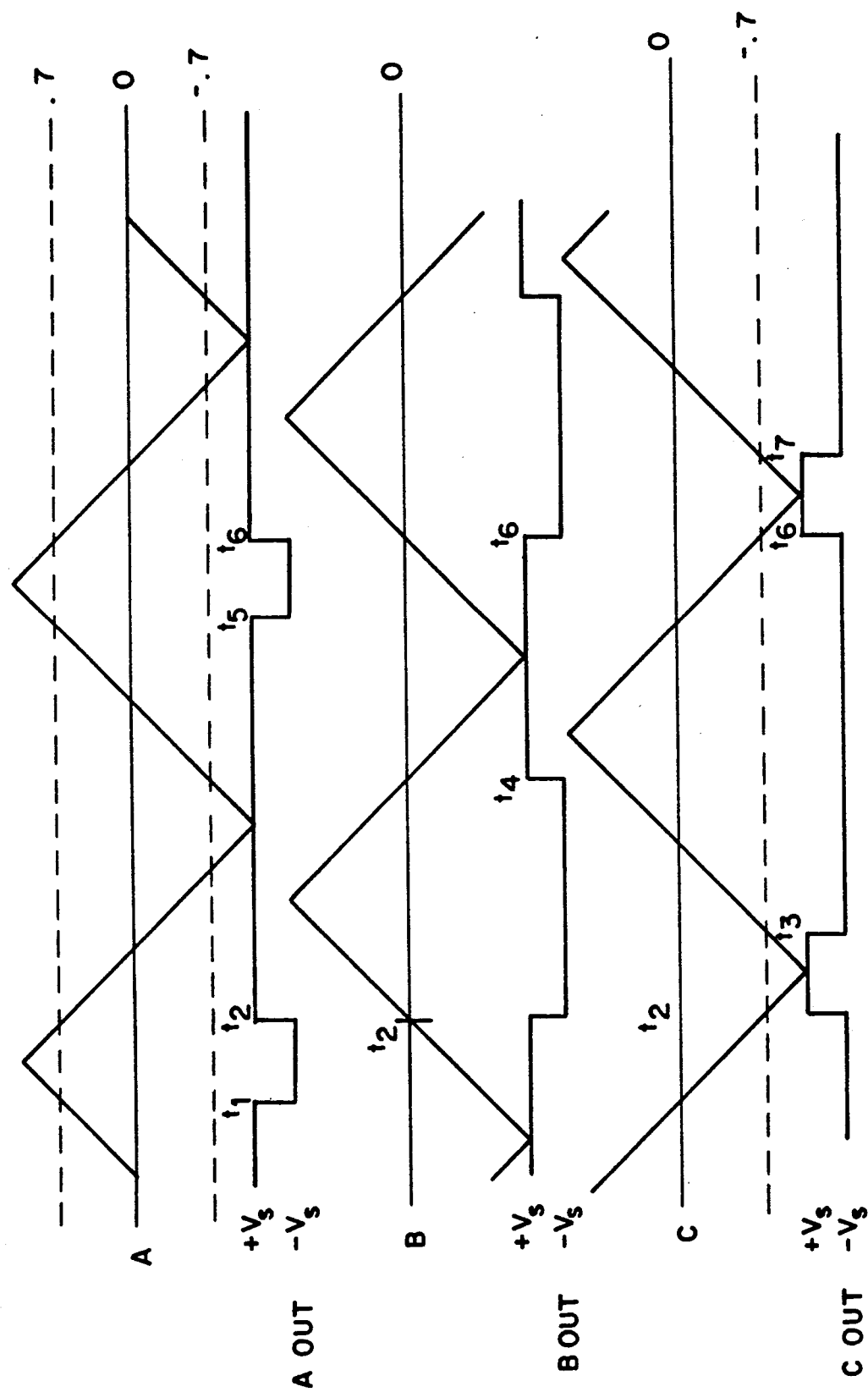
FIG. 3 is a graph of phase displaced oscillator signals of the three phase PWM.
Figure 4:
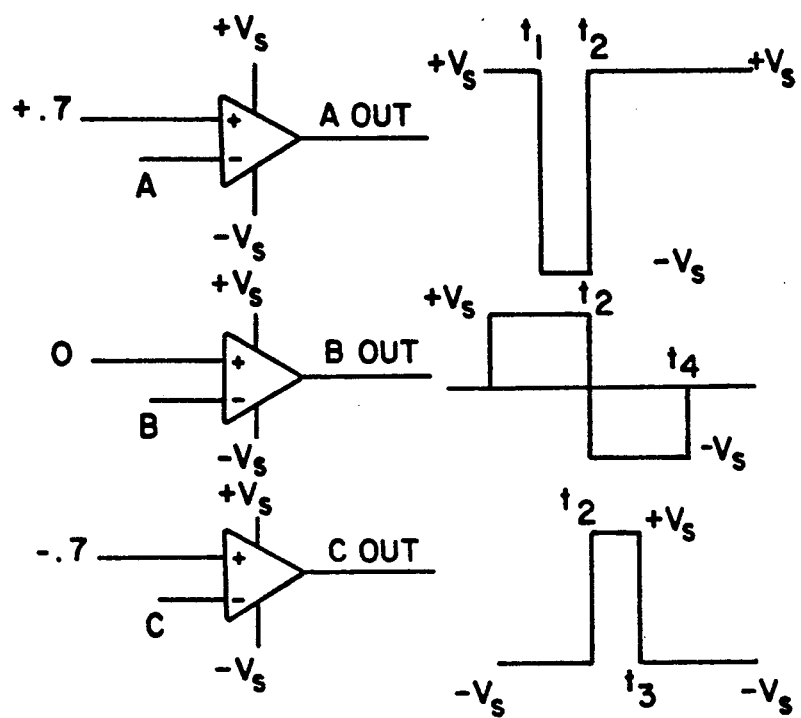
FIG. 4 is a schematic representation of comparators which can produce a three phase PWM with the oscillator signals of FIG. 3.

Referring to FIG. 4, there is shown a schematic representation of the comparators 20 and the corresponding comparator signals output by the respective comparators 20 for the oscillator signals shown in FIG. 3. With respect to comparator 20 with the A input port, there is provided for exemplary purposes a command signal of 0.7 volts to the other input port of comparator 20 with input port A. The comparator 20 compares the two inputted signals and produces a signal of +Vs volts whenever the + input is more positive than the − input. Accordingly, referring to signal A of FIG. 3, the comparator output signal is +Vs volts until the value of signal A rises above +0.7 volts. At that point, the comparator 20 output signal drops to −Vs volts and maintains a value of −Vs volts until the signal A drops below +0.7 volts. The comparator signal from comparator 20 with input port A repeats this pattern in correspondence with signal A of FIG. 3.

With respect to signal B and comparator 20 with input port B, the command signal on the other port is maintained at 0 volts. Accordingly, the comparator 20 with input port B compares the value of the two input signals and produces a +Vs volt comparator output signal whenever the value at the + input is more positive than the value at the − input. When the value at the + input signal is more negative than the value at the − input, then a −Vs volt signal is produced. Similarly, with reference to FIG. 3 and signal B, whenever the signal B is above 0 volts, then a −Vs volt comparator signal is maintained. Whenever the signal B is below 0 volts, then a +Vs volt comparator signal is maintained.

Figure 5:
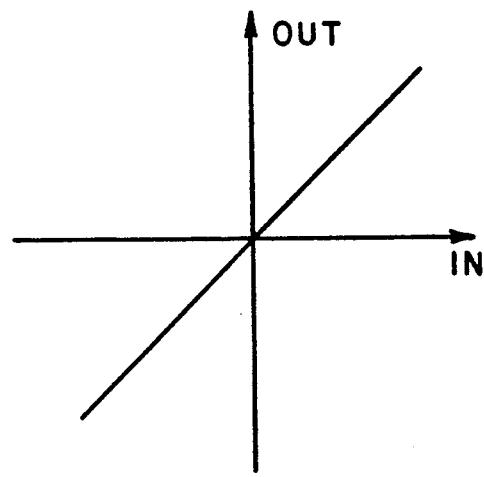
FIG. 5 is a graph representing linear gain through zero command for the MPWM.
Figure 6:
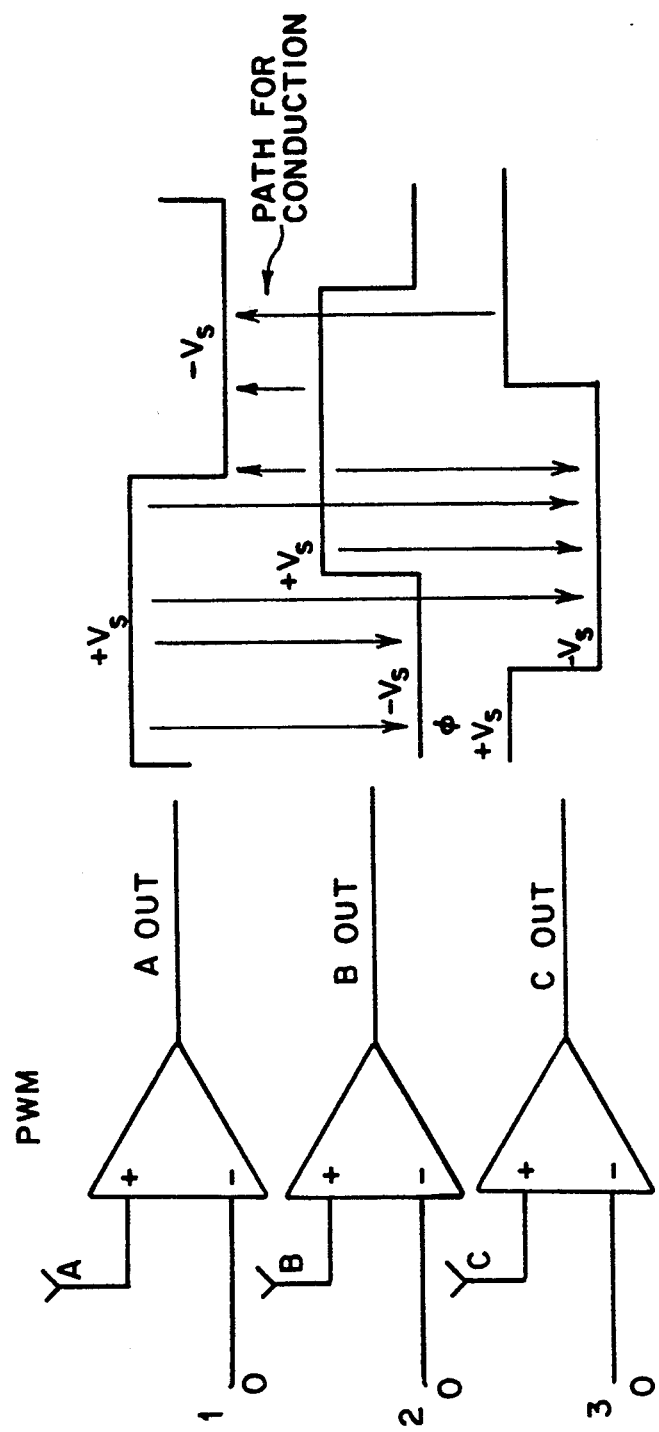
FIG. 6 is a graph of the comparator signals output when the command signals to the respective comparators are each at zero volts, and shows the conduction paths at each instant of time to produce continuous conduction.

With respect to comparator 20 with input port C, there is a −0.7 volt command signal inputted into the other input port. Whenever the signal C is more positive than −0.7 volts, then a −Vs volt comparator signal is produced. When the signal C is more negative than −0.7 volts, then a +Vs volt comparator signal is produced. Thus, by displacing the phases of the three signals provided to the three different phases of the motor 12, there is always present across the motor 12 a desired polarity to allow for continuous conduction therein as shown in FIGS. 4 and 6. That is, in the three phase motor and driver shown in FIG. 2, there is always one or two upper transistors 30 which can produce +Vs when at least two or one lower transistors 32 can produce −Vs. FIG. 5 shows a graph representing linear gain through zero command because continuous conduction occurs at all times, even at zero command.

Figure 7:
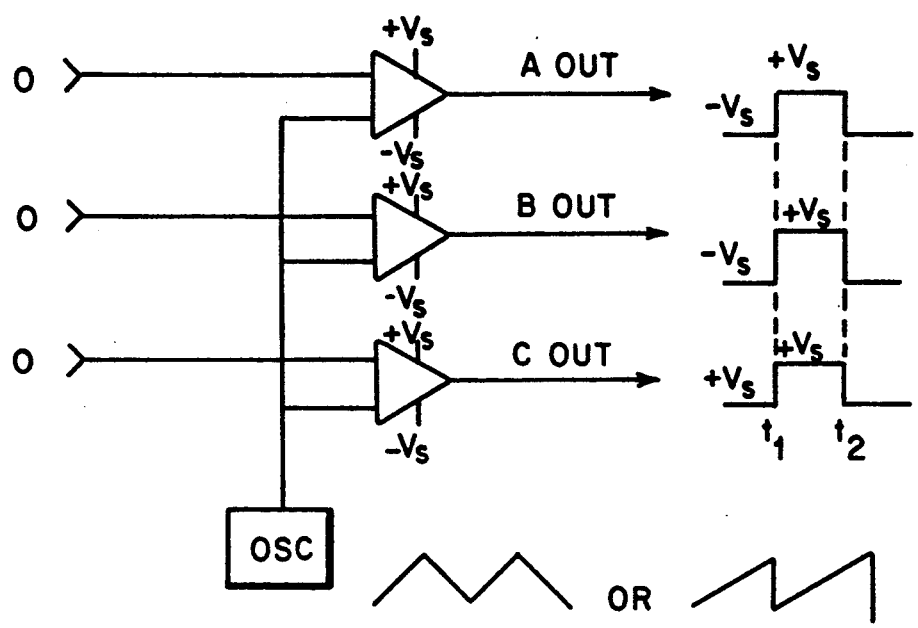
FIG. 7 is a schematic representation of the prior art pulse width modulator for a three phase motor with 0 volt command signals, and shows there are no paths for conduction because all three outputs are always the same voltage.
Figure 8:
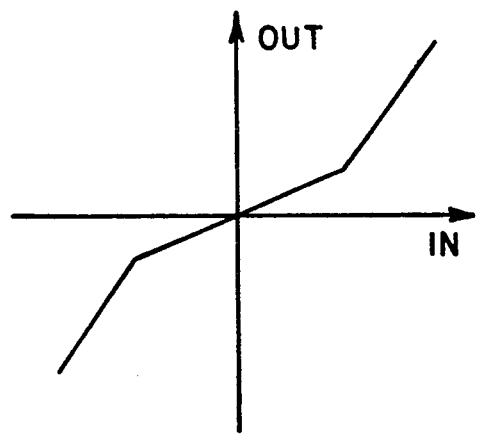
FIG. 8 is a graph of the gain of a PWM for a three phase motor with respect to the prior art.

In another example and referring to the oscillator signals of FIG. 3 when the command signals are all at 0 volts, such as FIG. 6. Each comparator 20 then produces a +Vs volt comparator signal whenever the oscillator signal is more positive than 0, and −Vs volts when it is more negative than 0. The comparator signals resulting are depicted in FIG. 6. This is contrasted to the comparator output signals of FIG. 7 where all comparator outputs are at +Vs or −Vs simultaneously, preventing any conduction through the motor load of FIG. 2.

The entire MPWM can, for example, be implemented in a digital computer. This MPWM technique includes 3-state MPWMs whereby motor currents circulate in the motor, without returning to the supply, allowing shorter transistor conduction times while still preventing discontinuous conduction.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A multiphase motor having a corresponding number of windings to the number of phases and a multiphase pulse width modulator in communication with the motor, said modulator allowing for continuous conduction of current through each winding in a multiphase motor at all times of the motor's operation.

2. A multiphase motor as described in claim 1 wherein the modulator is comprised of:
   a clock for producing a switching reference frequency signal; and
   means for providing signals to the respective phase of the multiphase motor such that the signals allow for continuous conduction of current through each winding in the motor at all times of the motor's operation, said providing means connected to the clock for receiving the switching reference frequency signal, and connected to the phases of the multiphase motor to provide the signals to the respective phases of the multiphase motor.

3. A multiphase motor as described in claim 2 wherein the providing means includes an N phase oscillator, where N=the number of windings, for providing N oscillator signals, each of which are out of phase by a predetermined amount, said oscillator electrically connected to the clock to receive the switching signal; and
   N comparators electrically connected to the N phase oscillator to receive the respective N oscillator signals, and the respective phases of the multiphase motor for producing a respective comparator signal corresponding to the respective signal received from the oscillator such that the N comparator signals allow for continuous conduction in the motor during the operation of the motor.

4. A multiphase motor as described in claim 3 wherein each respective signal produced by the N phase oscillator for the respective comparator is 120° out of phase with the other signals.

5. A multiphase motor as described in claim 4 wherein N=3.

6. A multiphase motor as described in claim 5 wherein each comparator also receives a predetermined command signal.

7. A multiphase pulse width modulator for an N phase motor having N windings, where N≧3, comprising:
   a clock for producing a switching frequency signal; and
   means for providing N signals to the respective N phases of the N phase motor such that the signals allow for continuous conduction of current through each winding in the motor at all times of the motor's operation, said providing means connected to the clock for receiving the switching frequency, and connected to the N phases of the N phase motor to provide the N signals to the respective N phases of the N phase motor.

8. A multiphase pulse width modulator as described in claim 7 wherein the providing means includes an N phase oscillator for producing N oscillator signals, each of which are out of phase by a predetermined amount, said oscillator electrically connected to the clock to receive the switching signal; and N comparators electrically connected to the N phase oscillator to receive the respective N oscillator signals, and the respective N phases of the N phase motor for producing a respective comparator signal corresponding to the respective signal received from the oscillator such that the N comparator signals allow for continuous conduction in the motor during the operation of the motor.

9. A multiphase pulse width modulator as described in claim 8 wherein N=3.

10. A multiphase pulse width modulator as described in claim 9 wherein each respective signal produced by the N phase oscillator for the respective comparator is 120° out of phase with the other signals.

11. A multiphase pulse width modulator as described in claim 10 wherein each comparator also receives a predetermined command signal.

* * * * *